Aug. 5, 1958    H. VOLKERS    2,846,581
TRANSISTOR PULSE GENERATOR CIRCUIT
Filed July 17, 1956

INVENTOR
HENDRIK VOLKERS

BY *Fred Vogel*
AGENT

United States Patent Office 2,846,581
Patented Aug. 5, 1958

2,846,581

TRANSISTOR PULSE GENERATOR CIRCUIT

Hendrik Volkers, Hilversum, Netherlands, assignor, by mesne assignments, to North American Philips Company, Inc., New York, N. Y., a corporation of Delaware Application July 17, 1956, Serial No. 598,473

Claims priority, application Netherlands July 20, 1955

5 Claims. (Cl. 250—36)

The present invention relates to pulse generating systems. More particularly, the invention relates to a transistor having an aperiodical positive feed-back circuit including a transformer, one winding of the transformer being included, in series with a source of supply, between the emitter and the collector of the transistor. Another winding of the transformer is connected, in series with a resistor, between the emitter and the base of the transistor. It has been found that difficulties may occur in such circuits when the transistor starts to oscillate.

An object of the present invention is to provide simple but effective means for overcoming initial starting difficulties in pulse generating systems of the type described.

In accordance with the present invention, the terminal of the source of supply which is connected to the collector is also coupled via a capacitor to one extremity of said resistor. The other extremity of the resistor is connected to the emitter of the transistor, to produce a switching pulse when the source of supply is switched into circuit. The switching pulse reaches, via the capacitor, the base of the transistor, and polarizes it in the forward direction and facilitates the initiation of operation of the system.

Figure 1:
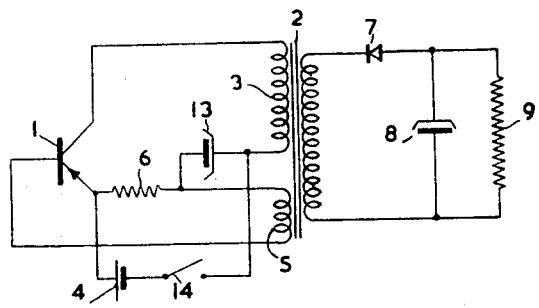
Figure 2:
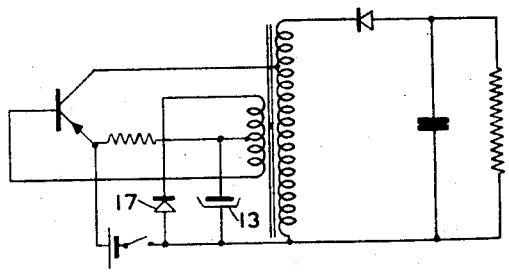

In order that the invention may be readily carried into effect, it will now be described, by way of example, with reference to the accompanying drawing, in which:

Fig. 1 is a schematic diagram of an embodiment of the circuit arrangement of the invention; and Fig. 2 is a modification of the embodiment of Fig. 1.

Fig. 1 shows a transistor 1, which is caused to oscillate by feedback through a transformer 2. For this purpose a winding 3 of transformer 2 is connected, in series with a source of supply 4, between the emitter and the collector of transistor 1. A winding 5 of transformer 2 is connected, in series with a resistor 6, which limits the base current, between the emitter and the base. The voltage pulses produced via the transformer 2, the amplitude of which may be considerably greater than the voltage of source 4 and the energy of which may be considerably higher than the energy dissipated in transistor 1, may serve to supply a consuming device or load 9, for example by means of a rectifier 7 and a smoothing capacitor 8.

It may be difficult to initiate circuit operation to produce oscillations in the system, especially if the resistor 6 and hence the winding 5 are given comparatively low values for the purpose of increasing the useful output of the circuit. It is possible, for example, to supply also a forward biassing potential to the base, but in this case transistor 1 is liable to be overloaded, for example if the consuming device 9 is short-circuited. As a further alternative, the source of supply 4 may be connected in series with the capacitor 8, which causes the starting period of the oscillation to be loaded less heavily, but in this case the oscillatory circuit and the load circuit are no longer separate.

According to the invention, a capacitor 13 is included between the resistor 6 and the source 4, so that, when the source 4 is switched into circuit, for example by means of a switch 14, a swtiching pulse active in the forward direction, reaches the base of the transistor via capacitor 13, so that it is made much easier for the circuit to start oscillating.

In one practical embodiment, the capacitor 13 has a value of, for example, between 1 and 5 microfarards with a value of 10 ohms for resistor 6 and a pulse repetition frequency of 1000 C./S.

Fig. 2 is a modification of the embodiment of Fig. 1, in which the capacitor 13 is also included in a circuit comprising a rectifier 17, by means of which the generated pulses, when a prescribed amplitude is exceeded, provide via capacitor 13 a direct control voltage which stabilizes the amplitude and the frequency of the pulses produced.

What is claimed is:

1. A circuit arrangement comprising a transistor having an input electrode, an output electrode and a third electrode, a voltage source for energizing said transistor, transformer means interconnecting said electrodes in feedback relationship, said transformer means comprising a first winding portion connected in series circuit arrangement with said voltage source to said output electrode and a second winding portion connected in series circuit arrangement between said input and third electrodes, switching means for connecting said source in circuit, said switching means producing a switching pulse upon actuation thereof, and means for facilitating the start of oscillations in said circuit arrangement upon actuation of said switching means comprising a capacitor for applying said switching pulse to said input electrode in a sense initially polarizing said transistor in a forward conducting direction.

2. A circuit arrangement comprising a transistor having an input electrode, an output electrode and a third electrode, a voltage source for energizing said transistor, a resistor, transformer means interconnecting said electrodes in feedback relationship, said transformer means comprising a first winding portion connected in series circuit arrangement with said voltage source between said third and output electrodes, said voltage source being connected to said third electrode, and a second winding portion connected in series circuit arrangement with said resistor between said input and third electrodes, said resistor being connected to said third electrode, switching means for connecting said source in circuit, said switching means producing a switching pulse upon actuation thereof, and means for facilitating the start of oscillations in said circuit arrangement upon actuation of said switching means comprising a capacitor for applying said switching pulse to said input electrode in a sense initially polarizing said transistor in a forward conducting direction.

3. A circuit arrangement comprising a transistor having an input electrode, an output electrode and a third electrode, a voltage source for energizing said transistor, a resistor, transformer means interconnecting said electrodes in feedback relationship, said transformer means comprising a first winding portion connected in series circuit arrangement with said voltage source between said third and output electrodes, said voltage source being connected to said third electrode, and a second winding portion connected in series circuit arrangement with said resistor between said input and third electrodes, said resistor being connected to said third electrode, switching means for connecting said source in circuit, said switching means producing a switching pulse upon actuation thereof, and means for facilitating the start of oscillations in said circuit arrangement upon actuation of said switching means comprising a capacitor for applying said switching pulse to said input electrode in a sense initially polarizing said transistor in a forward conducting direction and means connecting said capacitor between a point in said first-mentioned series circuit arrangement between said first winding portion and said voltage source and a point in said second-mentioned series circuit arrangement between said second winding portion and said resistor.

4. A circuit arrangement comprising a transistor having emitter, collector and base electrodes, a voltage source for energizing said transistor, a resistor, switching means for connecting said source in circuit, said switching means producing a switching pulse upon actuation thereof, transformer means interconnecting said electrodes in feedback relationship, said transformer means comprising a first winding portion connected in series circuit arrangement with said voltage source and said switching means between said emitter and collector electrodes, said voltage source being connected to said emitter electrode, and a second winding portion connected in series circuit arrangement with said resistor between said emitter and base electrodes, said resistor being connected to said emitter electrode, and means for facilitating the start of oscillations in said circuit arrangement upon actuation of said switching means comprising a capacitor for applying said switching pulse to said base electrode in a sense initially polarizing said transistor in a forward conducting direction and means connecting said capacitor between a point in said first-mentioned series circuit arrangement between said first winding portion and said voltage source and a point in said second-mentioned series circuit arrangement between said second winding portion and said resistor.

5. A circuit arrangement comprising a transistor having emitter, collector and base electrodes, a voltage source for energizing said transistor, a resistor, transformer means interconnecting said electrodes in feedback relationship, said transformer means comprising a first winding portion connected in series circuit arrangement with said voltage source between said emitter and collector electrodes and a second winding portion connected in series circuit arrangement with said resistor between said emitter and base electrodes, switching means for connecting said source in circuit, said switching means producing a switching pulse upon actuation thereof, and means for facilitating the start of oscillations in said circuit arrangement upon actuation of said switching means comprising a capacitor for applying said switching pulse to said base electrode in a sense initially polarizing said transistor in a forward conducting direction, and means for stabilizing the value of said oscillations comprising means for deriving said oscillations from said transformer means, means for rectifying said oscillations to produce a resultant control voltage and means for applying said control voltage across said capacitor.

References Cited in the file of this patent

UNITED STATES PATENTS 2,780,767 Janssen Feb. 5, 1957